(12) United States Patent
Yang et al.

(10) Patent No.: US 12,409,528 B1
(45) Date of Patent: Sep. 9, 2025

(54) FINISHING DEVICE AND METHOD FOR DISTRIBUTED AERO-ENGINE BEARING RINGS

(71) Applicant: Taiyuan University of Technology, Taiyuan (CN)

(72) Inventors: Shengqiang Yang, Taiyuan (CN); Xuenan Li, Taiyuan (CN); Zhiwei Du, Taiyuan (CN); Wenhui Li, Taiyuan (CN); Xiuhong Li, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 0 days.

(21) Appl. No.: 19/028,293

(22) Filed: Jan. 17, 2025

(30) Foreign Application Priority Data

Mar. 11, 2024 (CN) .......................... 202410269009.6

(51) Int. Cl.
*B24B 31/02* (2006.01)
*B24B 31/027* (2006.01)
*B24B 31/06* (2006.01)

(52) U.S. Cl.
CPC ........ *B24B 31/0224* (2013.01); *B24B 31/027* (2013.01); *B24B 31/064* (2013.01); *F16C 2223/06* (2013.01)

(58) Field of Classification Search
CPC .................. B24B 31/003; B24B 31/02; B24B 31/0224; B24B 31/027; B24B 31/06; B24B 31/064; F16C 2223/06

(Continued)

(56) References Cited

U.S. PATENT DOCUMENTS 2,613,036 A * 10/1952 Robinson ................ B02C 17/14
    451/328
3,611,638 A * 10/1971 Deede .................... B24B 31/064
    451/326

(Continued)

FOREIGN PATENT DOCUMENTS

CN      203887675 U  * 10/2014
CN      115026710 A  * 9/2022 ........... B24B 31/003

(Continued)

OTHER PUBLICATIONS

Yang, CN115122223A machine translation, Sep. 30, 2022 (Year: 2022).*

(Continued)

*Primary Examiner* — Brian D Keller
*Assistant Examiner* — Marcel T Dion
(74) *Attorney, Agent, or Firm* — WCF IP (57) ABSTRACT

Provided are a finishing device for aero-engine bearing rings and a finishing method for distributed aero-engine bearing rings, which belong to the technical field of grinding or polishing devices or techniques, and solve the technical problem of low finishing efficiency of an existing rotary barrel finishing by floating clamp. N suspension assemblies are arranged in a container body, and the centers of the N suspension assemblies are located on a second virtual circle with the center of a bottom wall of the container body as the center of a circle. Through an eccentric arrangement of a bearing ring to be finished, an internal space of the container body is effectively and reasonably utilized, and N bearing rings can be simultaneously finished.

5 Claims, 11 Drawing Sheets

(58) Field of Classification Search
USPC .......................................... 451/32, 326, 328
See application file for complete search history.

(56) References Cited

U.S. PATENT DOCUMENTS

| | | | | |
|---|---|---|---|---|
| 4,484,416 A | * | 11/1984 | Zenss .................. | B24B 31/0224 |
| | | | | 269/45 |
| 4,581,853 A | * | 4/1986 | Marcus ................ | B24B 31/003 |
| | | | | 451/104 |
| 5,536,203 A | * | 7/1996 | Takeyoshi ............ | B22D 31/007 |
| | | | | 451/328 |

FOREIGN PATENT DOCUMENTS

| | | | |
|---|---|---|---|
| CN | 115122223 A | * | 9/2022 |
| WO | WO-2016062856 A1 | * | 4/2016 |

OTHER PUBLICATIONS

Wang, CN203887675U machine translation, Oct. 22, 2014 (Year: 2014).*

Luo, CN115026710 machine translation, Sep. 9, 2022 (Year: 2022).*

* cited by examiner

FINISHING DEVICE AND METHOD FOR DISTRIBUTED AERO-ENGINE BEARING RINGS

CROSS-REFERENCE TO RELATED APPLICATION

This patent application claims the benefit and priority of Chinese Patent Application No. 202410269009.6, filed with the China National Intellectual Property Administration on Mar. 11, 2024, the disclosure of which is incorporated by reference herein in its entirety as part of the present application.

TECHNICAL FIELD

The present disclosure belongs to the technical field of grinding or polishing devices or techniques, and in particular to a finishing device and method for distributed aero-engine bearing rings.

BACKGROUND

Aero-engine is a typical rotating machine, and bearing plays an important role in the rotation of the aero-engine. However, the service environment of the bearing of the aero-engine is harsh, which puts forward higher requirements for the manufacturing of the bearing. Bearing rings with different sizes and profile characteristics are existed on the aero-engine, and the inner, outer and end surfaces of the bearing rings are the main working surfaces or mounting and positioning surfaces, and thus final surface quality of the bearing rings directly affects the service performance and service life of the bearings. At present, various grinding methods are still the mainstream finishing methods, but the surface integrity forming capacity of the bearing ring after grinding is insufficient, and the surface of the bearing ring still needs to be finished.

Barrel finishing is a collaborative manufacturing technology of structure shape and surface integrity manufacturing process, which has less material removal amount during finishing, has little influence on the finishing accuracy of parts, and is suitable for parts with high finishing accuracy requirements. In the prior art, a rotary barrel finishing by floating clamp (CN202211059711.7) for finishing bearing ring surfaces is provided, which includes a finishing container, a lower connecting disk, an upper connecting disk, and at least three support bars. The finishing container includes a container body and a sealing cover in detachable connection, the lower connecting disk is fixedly connected to the center of a bottom wall of the container body, and the upper connecting disk is fixedly connected to the center of an inner wall of the sealing cover. A middle point of the bottom wall of the container body and a middle point of the sealing cover are both located on a rotating axis of the floating clamp, both ends of the support rod are detachably and vertically connected to the upper connecting disk and the lower connecting disk, respectively, and all the support rods are evenly distributed on a circumference with the center of the bottom wall of the container body as the center. A ring to be finished is sleeved outside all support rods, and an inner diameter of the ring to be finished is greater than a radius of the circumference where the support rods are located. The finishing container is filled with finishing media, and all the support rods used for supporting the ring to be processed jointly form a suspension assembly. Through the device, when the ring is clamped without damage, each surface of the ring can be subjected to one-time finishing, and the rotation can ensure the finishing uniformity. However, the bearing ring is located at a central position of the container body at which the motion of the finishing media is weak. When the media act on each surface of the ring, the acting force of the media is small, which leads to low finishing efficiency and processing ability. Therefore, there is an urgent need of a finishing device and method capable of enhancing surface integrity forming capacity of the ring by enhancing the action of the finishing media on each surface of the ring and achieving efficient polishing and grinding.

SUMMARY

To overcome the technical defects of low finishing efficiency of an existing rotary finishing floating tooling, the present disclosure provides a finishing device and method for distributed aero-engine bearing rings.

The present disclosure provides a finishing device for distributed aero-engine bearing rings, including a finishing container, an upper connecting disk, a lower connecting disk, an upper limiting bar, a lower limiting bar, and a suspension assembly. The finishing container includes a container body and a sealing cover in detachable connection. The suspension assembly includes multiple support rods configured to support a bearing ring to be finished and uniformly distributed along a first virtual circle. The finishing container is filled with finishing media, and the number of the suspension assemblies is N. The centers of the N suspension assemblies are located on a second virtual circle which takes the center of a bottom wall of the container body as the center, and the N suspension assemblies are uniformly distributed along the second virtual circle. A radius of the first virtual circle in each suspension assembly is $R_d$, a radius of the support rod in each suspension assembly is $R_{sb}$, and the centers of N first virtual circles (100) corresponding to the N suspension assemblies are $O_i$, respectively, in which i=1, 2, . . . , N. A spacing between the center $O_i$ of each of the N first virtual circles and the center O of the second virtual circle is e, that is, e is an eccentric distance of the center $O_i$ of each of the N first virtual circles relative to the center O of the second virtual circle. The device further includes a rotary driving motor, a universal joint coupling, mounting frames, and an excitation platform. Flanges are fixedly connected to central positions of a front wall and a rear wall outside the finishing container, respectively, and support shafts are fixedly connected to the central positions of the front wall and the rear wall outside the finishing container by the flanges, respectively. The mounting frames are fixedly connected to the excitation platform by stiffener plates, a rotating bearing is rotatably mounted at an upper part of each mounting frame, and the support shafts on the front wall and the rear wall of the finishing container are connected to the rotating bearings on the mounting frames, respectively. The support shaft on one side is connected to an output shaft of the decelerated rotary driving motor through the universal joint coupling.

The number N of the suspension assemblies satisfies a formula (I):

$$N \leq \min\left\{\frac{1000F}{\omega^2 A(m_r + 6m_{sb} + 6m_{lb})}, \frac{m_p - m_m - m_v - m_t}{(m_r + 6m_{sb} + 6m_{lb})}\right\}, \quad \text{(I)}$$

$$\left. \frac{60T_s t_s}{\pi n R^2 (m_r + 6m_{sb} + 6m_{lb})} - \frac{m_p - m_m - m_v}{(m_r + 6m_{sb} + 6m_{lb})} \right\}$$

in the formula (I), ω is an angular frequency, ω=2πf; f is an excitation frequency, Hz; A is an excitation amplitude, mm; $m_r$ is a mass of the bearing ring to be finished, kg; $m_{sb}$ is a mass of the support rod, kg; $m_{lb}$ is a total mass of the upper limiting bar and the lower limiting bar, kg; $m_p$ is a total mass of the upper connecting disk and the lower connecting disk, kg; $m_m$ is a mass of the finishing media, kg; $m_v$ is a mass of the finishing container, kg; $m_t$ is a total mass of the flange, the support shaft, the mounting frame, the rotating bearing as well as the stiffener plate on the mounting frame (8), kg; F is an excitation force capable of being provided by the excitation platform, N; $T_s$ is a starting torque of the rotary driving motor (1), N·m; $t_s$ is starting time of the rotary driving motor (1), s; n is a rotating speed of the finishing container, r/min; and R is an inner radius of the container body, m.

The eccentric distance e satisfies e>$\sqrt{2}R_o$+$\sqrt{2}R_i$−$\sqrt{2}R_d$−2$\sqrt{2}R_{sb}$, which is used to prevent rings in the container body from interfering with each other. e can be obtained from a formula (II):

$$e = R - l_2 - \frac{3}{2}R_o + \frac{1}{2}R_i \quad (II)$$

in the formula (II), R is an inner radius of the container body, m, and if the container body is a polygon, such as a regular hexagon, R is a radius of an inscribed circle of the container body; $l_2$ is a vertical distance from an outer surface of the bearing ring to be finished at the lowest end to an inner wall of the container body when the finishing container is stationary, m; $l_2$ is greater than 3d, and d is a diameter of the finishing media; $R_o$ is an outer diameter of the bearing ring to be finished, m; $R_i$ is an inner diameter of the bearing ring to be finished, m.

When the finishing container is stationary, a vertical distance from the support rod at the lowest end in the suspension assembly and an inner surface of the bearing ring to be finished is $l_1$, where $l_1$ is greater than A, and can be obtained through a formula (III)

$$l_1 = 2R_i - 2R_{sb} - 2R_d \quad (III)$$

The present disclosure further provides a finishing method for distributed aero-engine bearing rings. The method is implemented based on the finishing device for distributed aero-engine bearing rings, and includes the following steps:

Step 1: mounting N bearing rings to be finished onto N suspension assemblies in a finishing container, filling a container body of the finishing container with a finishing media, and assembling the container body and a sealing cover into the finishing container;

Step 2: fixedly connecting the finishing container to a position between two support shafts 3 by flanges;

Step 3: starting a rotary driving motor to make the finishing container to rotate around an axis thereof at a rotating speed n, starting an excitation platform at the same time to make the finishing container achieve a simple harmonic motion with an amplitude of $A_1$ and a frequency of $f_1$ in a vertical direction, where the finishing container forces finishing media therein to move in a compound motion attitude to carry out finishing on the bearing ring to be finished;

Step 4: changing an excitation direction of the excitation platform after finishing for time $t_1$, enabling the finishing container to achieve a simple harmonic motion with an amplitude of $A_2$ and a frequency of $f_2$ in a horizontal direction consistent with the axis thereof, wherein the finishing container forces finishing media therein to move in a compound motion attitude to carry out finishing on the bearing ring to be finished; and Step 5: completing surface finishing of the bearing ring to be finished after finishing for time $t_2$, turning off the excitation platform and the rotary driving motor, taking down the finishing container, and taking out the finished bearing ring from the finishing container.

Preferably, the rotating speed n of the finishing container ranges from 80% $n_{cr}$ to 120% $n_{cr}$, $$n_{cr} = \frac{42.7}{\sqrt{2R}}$$

is a critical rotating speed of the finishing container, and R is a radius of an inner wall of the container body, m.

Preferably, in Step 3, the excitation platform has an amplitude of 2-8 mm and a frequency of 5-25 Hz in a vertical direction.

Preferably, in Step 4, the excitation platform has an amplitude of 2-8 mm and a frequency of 5-25 Hz in a horizontal direction.

Preferably, a loading amount of the finishing media in the finishing container is 70%-90% of the volume of the finishing container.

Compared with the prior art, the technical solution provided by the present disclosure has the following beneficial effects: through an eccentric arrangement of a bearing ring to be finished, an internal space of the container body is effectively and reasonably utilized, and N bearing rings can be simultaneously machined. The function of finishing media in the container body is enhanced by the vibration of an excitation platform, such that the bearing ring to be finished can be located at an area where the finishing media have a strong function. The "wall effect" is fully utilized to improve the surface integrity forming capacity of the bearing ring while achieving efficient polishing and grinding. Moreover, through alternate implementation of exciting motions in a vertical direction and a horizontal direction, the finishing demand for the surface integrity forming of an inner surface, an outer surface and an end surface of the bearing ring can be satisfied.

BRIEF DESCRIPTION OF THE DRAWINGS

The accompanying drawings herein are incorporated into and constitute a part of this specification, which show the embodiments in line with the present disclosure, and serve to explain the principle of the present disclosure together with the specification.

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

In the drawings: 1—rotary driving motor; 2—universal joint coupling; 3—support shaft; 4—container body; 5—finishing container; 6—flange; 7—rotating flange; 8—mounting frame; 9—excitation platform; 10—lower connecting disk; 11—lower limiting bar; 12—suspension assembly; 13—bearing ring to be finished; 14—finishing media; 15—sealing cover; 16—support rod; 17—bottom wall; 18—stiffener plate; 100—first virtual circle; 200—second virtual circle.

DETAILED DESCRIPTION OF THE EMBODIMENTS

To make the objectives, features and advantages of the present disclosure more clearly, the following further describes the schemes of the present disclosure in detail. It should be noted that the embodiments in the present disclosure and the features in the embodiments can be combined with each other without conflict.

In the description, it should be noted that the terms "first" and "second" are used for descriptive purposes only and are not to be construed as indicating or implying relative importance. In the present disclosure, unless expressly specified and limited otherwise, the terms "mount", "couple" and "connect" should be understood broadly, e.g., may be a fixed connection, a detachable connection, or an integrated connection; may be a mechanical connection, or an electrical connection; may be a direct connection, an indirect connection through intermediate media, or an internal communication between two elements. For those of ordinary skill in the art, the specific meanings of the above terms in the present disclosure can be understood on a case-by-case basis.

Many specific details are set forth in the following description for the thorough understanding of the present disclosure. However, the present disclosure may also be implemented in a variety of manners different from those described herein. Apparently, the embodiments in the specification are only part rather than all of the embodiments of the present disclosure.

The specific embodiments of the present disclosure are further described below in detail with reference to FIG. 1 to FIG. 11.

Figure 1:
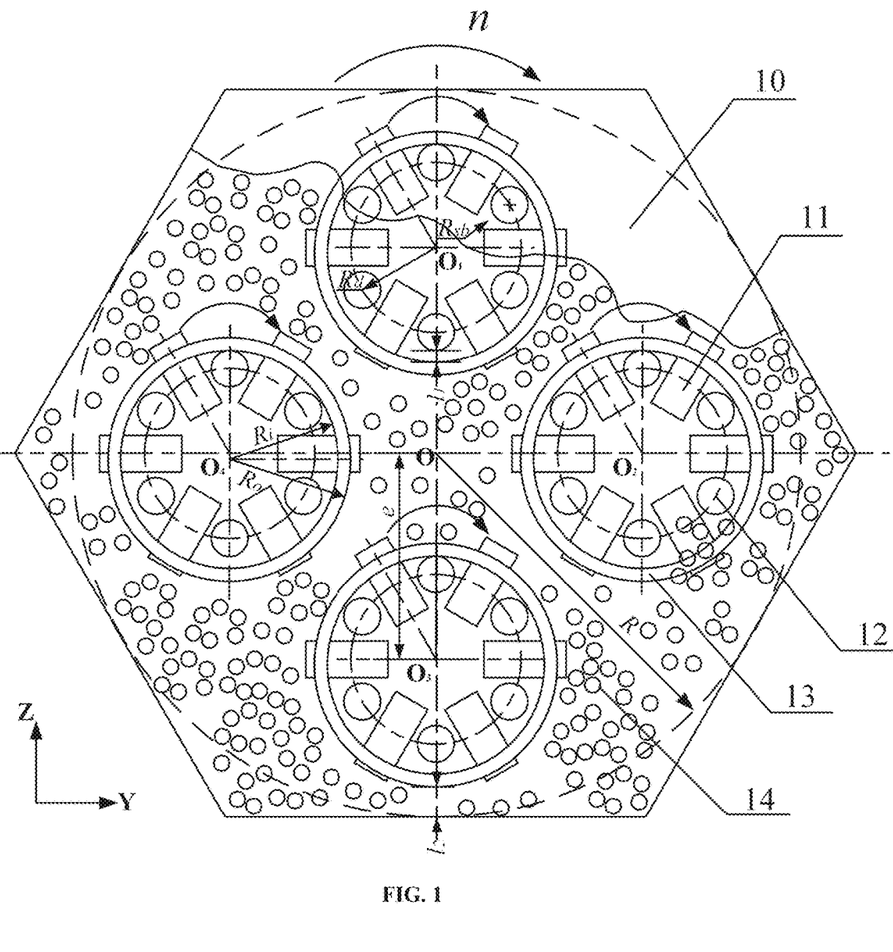
FIG. 1 is a schematic diagram of a container body of a finishing device for distributed aero-engine bearing rings according to a certain embodiment of the present disclosure and a distribution structure of bearing rings to be finished inside the container body.
Figure 2:
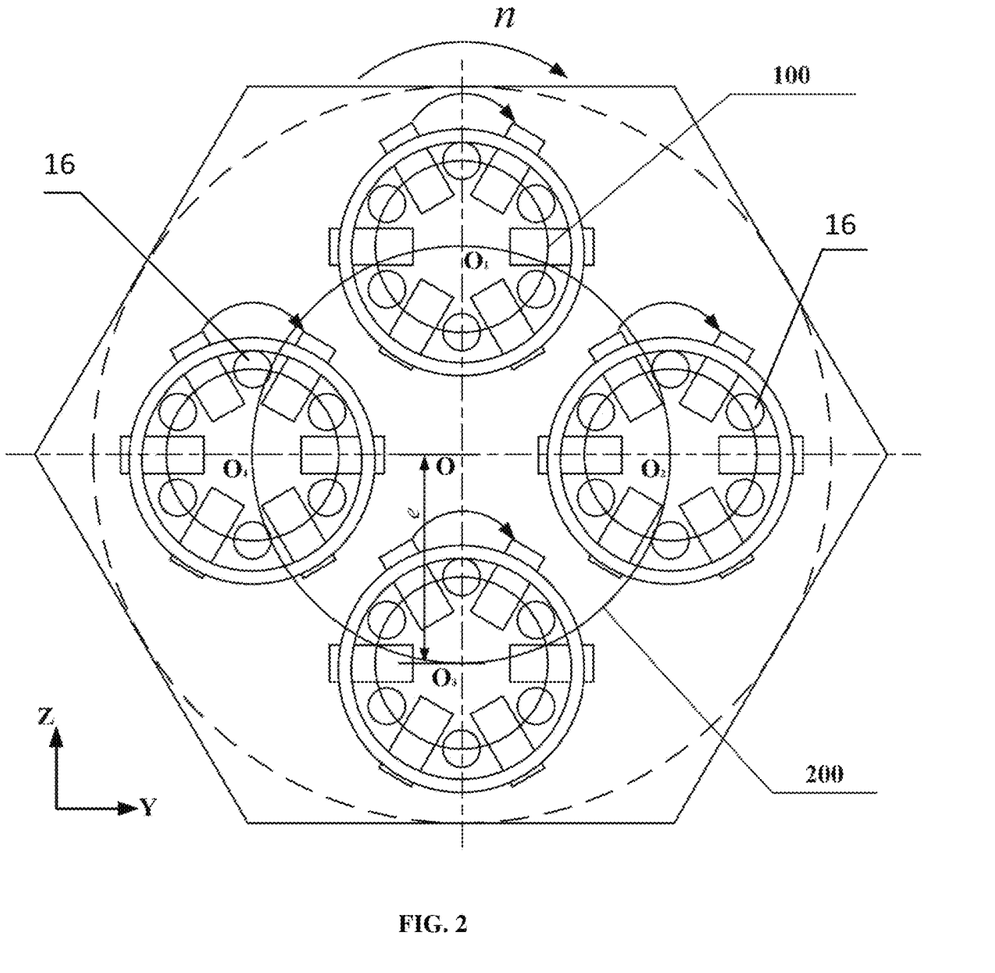
FIG. 2 is a schematic diagram of the distribution of multiple suspension assemblies inside a finishing device for distributed aero-engine bearing rings according to a certain embodiment of the present disclosure.

In an embodiment, as shown in FIG. 1 and FIG. 2, a finishing device for distributed aero-engine bearing rings includes a finishing container 5, an upper connecting disk, a lower connecting disk 10, an upper limiting bar, a lower limiting bar 11, and a suspension assembly 12. The finishing container 5 includes a container body 4 and a sealing cover 15 in detachable connection. The suspension assembly 12 is fixed into the container body 4, and includes multiple support rods 16 configured to support a bearing ring 13 to be finished and uniformly distributed along a first virtual circle 100. The finishing container is filled with finishing media 14, and the number of the suspension assemblies 12 is N. The N suspension assemblies 12 are fixedly connected to a bottom wall 17 of the container body 4 through the lower connecting disk 10. The centers of the N suspension assemblies 12 are located on a second virtual circle 200 which takes the center of a bottom wall 17 of the container body 4 as the center, and the N suspension assemblies 12 are uniformly distributed along the second virtual circle 200. A radius of the first virtual circle 100 in each suspension assembly 12 is $R_d$, a radius of the support rod 16 in each suspension assembly 12 is $R_{sb}$, and the centers of N first virtual circles 100 corresponding to the N suspension assemblies 12 are $O_i$, respectively, in which i=1, 2, ..., N. A spacing between the center $O_i$ of each of the N first virtual circles 100 and the center O of the second virtual circle 200 is e, that is, e is an eccentric distance of the center $O_i$ of each of the N first virtual circles 100 relative to the center O of the second virtual circle 200. The device further includes a rotary driving motor 1, a universal joint coupling 2, mounting frames 8, and an excitation platform 9. Flanges 6 are fixedly connected to central positions of a front wall (i.e. the sealing cover 15) and a rear wall (i.e. the bottom wall 17) outside the finishing container 5, respectively, and support shafts 3 are fixedly connected to the central positions of the front wall and the rear wall outside the finishing container 5 by the flanges 6, respectively. The mounting frames 8 are fixedly connected to the excitation platform 9 by stiffener plates 18, a rotating bearing 7 is rotatably mounted at an upper part of each mounting frame 8, and the support shafts 3 on the front wall and the rear wall of the finishing container 5 are connected to the rotating bearings 7 on the mounting frames 8, respectively. The support shaft 3 on one side is connected to an output shaft of the decelerated rotary driving motor 1 through the universal joint coupling 2.

The number N of the suspension assemblies 12 satisfies a formula (I):

$$N \leq \min\left\{ \frac{1000F}{\omega^2 A(m_r + 6m_{sb} + 6m_{lb})}, \frac{m_p - m_m - m_v - m_t}{(m_r + 6m_{sb} + 6m_{lb})} \right\}, \quad (I)$$

Figure 3:
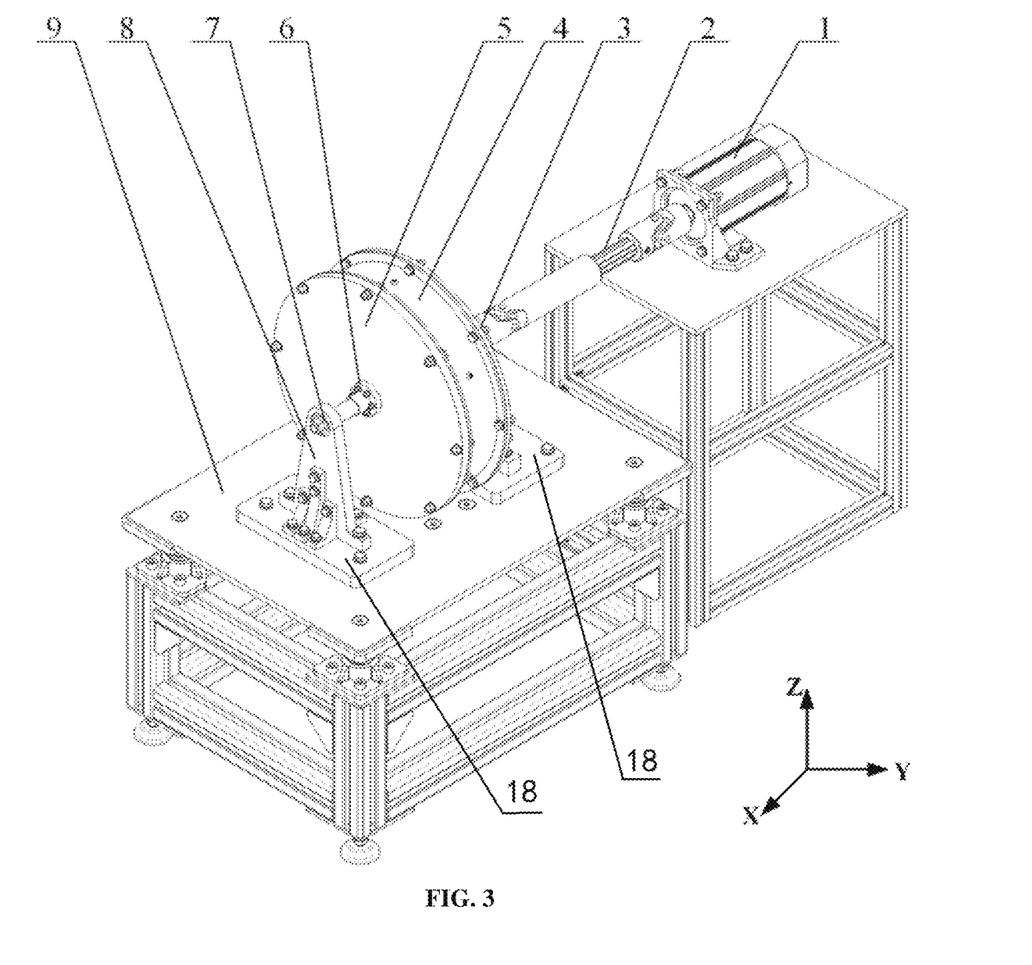
FIG. 3 is a schematic diagram of the mounting of a driving assembly when a finishing device for distributed aero-engine bearing rings according to a certain embodiment of the present disclosure is used for polishing and grinding.

-continued $$\frac{60T_s t_s}{\pi n R^2 (m_r + 6m_{sb} + 6m_{lb})} - \frac{m_p - m_m - m_v}{(m_r + 6m_{sb} + 6m_{lb})}\right\}$$

in the formula I, ω is an angular frequency, ω=2πf; f is an excitation frequency, Hz; A is an excitation amplitude, mm; $m_r$ is a mass of the bearing ring 13 to be finished, kg; $m_{sb}$ is a mass of the support rod 16, kg; $m_{lb}$ is a total mass of the upper limiting bar and the lower limiting bar, 111, kg; $m_p$ is a total mass of the upper connecting disk and the lower connecting disk 10, kg; $m_m$ is a mass of the finishing media, kg; $m_v$ is a mass of the finishing container 5, kg; $m_t$ is a total mass of the flange 6, the support shaft 3, the mounting frame 8, the rotating bearing 7 as well as the stiffener plate 18 on the mounting frame 8, kg; F is an excitation force capable of being provided by the excitation platform 9, N; $T_s$ is a starting torque of the rotary driving motor 1, N·m; $t_s$ is starting time of the rotary driving motor 1, s; n is a rotating speed of the finishing container 5, r/min; and R is an inner radius of the container body 4, m.

The eccentric distance e satisfies $e > \sqrt{2}R_o + \sqrt{2}R_i - \sqrt{2}R_d - 2\sqrt{2}R_{sb}$, which is used to prevent rings in the container body from interfering with each other. e can be obtained from a formula (II):

$$e = R - l_2 - \frac{3}{2}R_o + \frac{1}{2}R_i \qquad \text{(II)}$$

in the formula (II), R is an inner radius of the container body 4, m, and if the container body 4 is a polygon, such as a regular hexagon, R is a radius of an inscribed circle of the container body 4; $l_2$ is a vertical distance from an outer surface of the bearing ring 13 to be finished at the lowest end to an inner wall of the container body 4 when the finishing container 5 is stationary, m; $l_2$ is greater than 3d, and d is a diameter of the finishing media; $R_o$ is an outer diameter of the bearing ring 13 to be finished, m; $R_i$ is an inner diameter of the bearing ring 13 to be finished, m.

When the finishing container 5 is stationary, a vertical distance from the support rod 16 at the lowest end in the suspension assembly 12 limits the vertical motion of the bearing ring 13 to be finished is when the container body 4 vibrates in a vertical direction, $l_1$ greater than A need to be satisfied, and $l_1$ can be obtained through a formula (III):

$$l_1 = 2R_i - 2R_{sb} - 2R_d \qquad \text{(III).}$$

Figure 4:
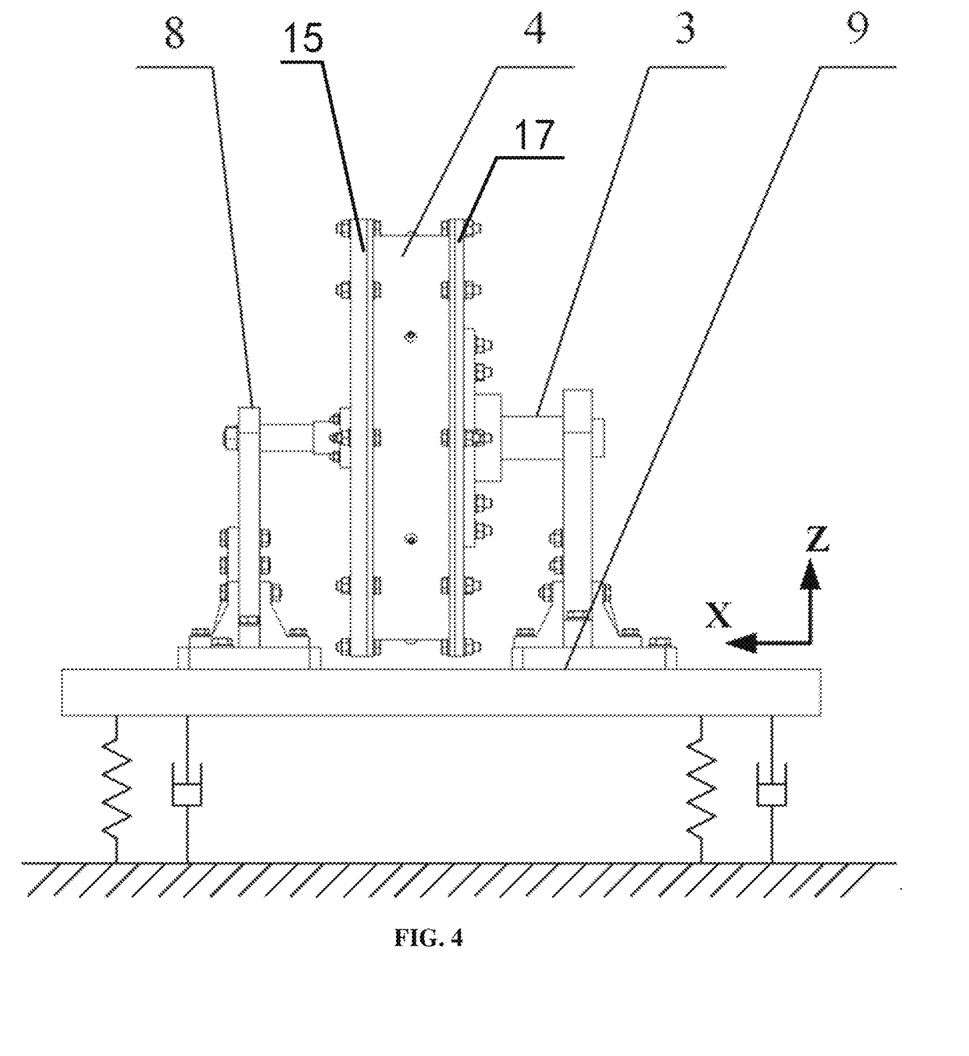
FIG. 4 is a schematic diagram of a finishing device for distributed aero-engine bearing rings according to a certain embodiment of the present disclosure when carrying out an excitation motion in a vertical direction.
Figure 5:
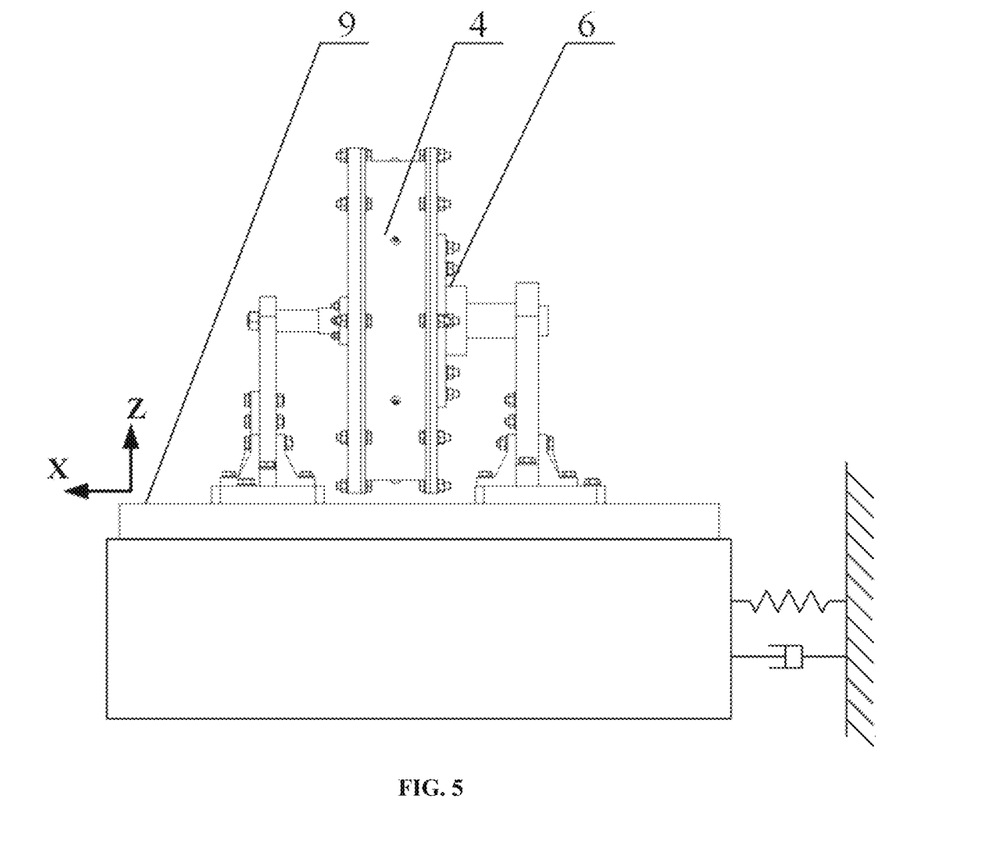
FIG. 5 is a schematic diagram of a finishing device for distributed aero-engine bearing rings according to a certain embodiment of the present disclosure when carrying out an excitation motion in a horizontal direction.
Figure 6:
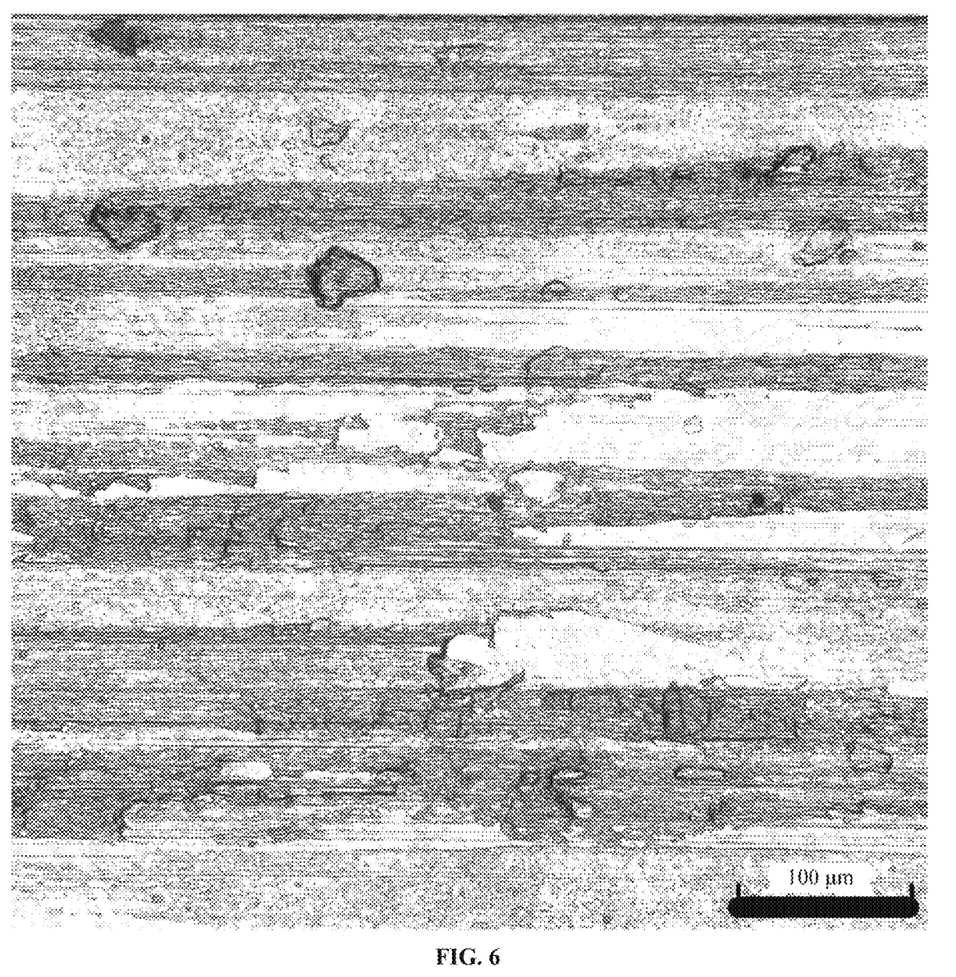
FIG. 6 is a surface topography diagram of an inner surface of a bearing ring to be finished according to an embodiment of the present disclosure before finishing.
Figure 7:
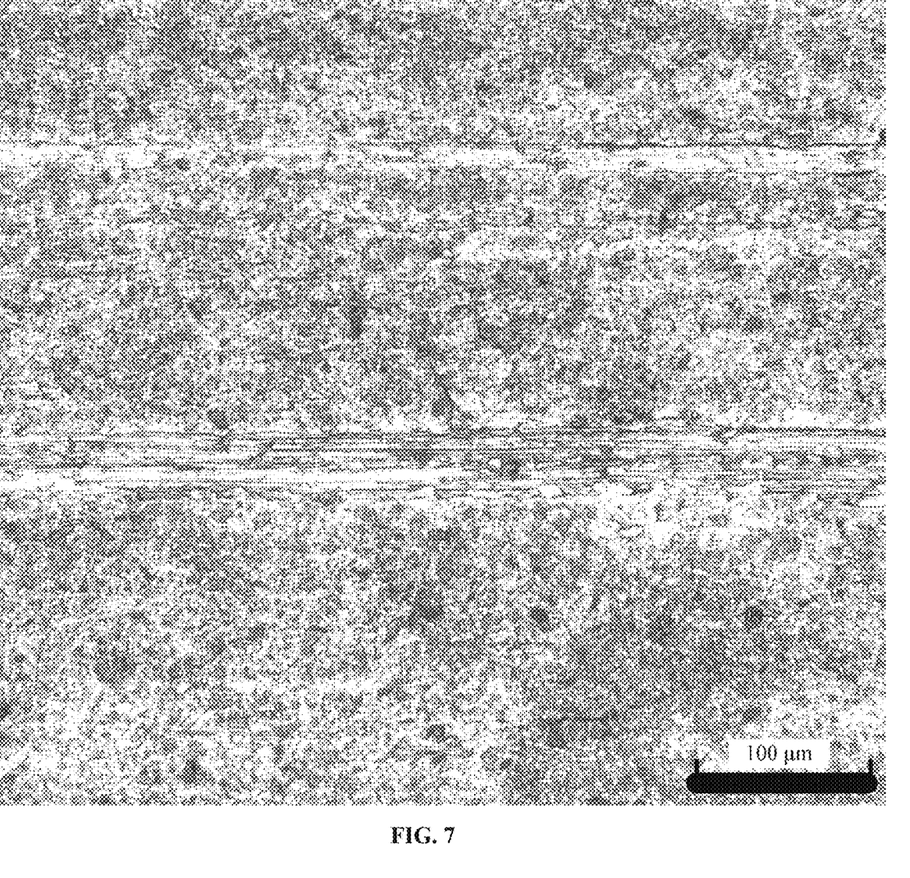
FIG. 7 is a surface topography diagram of an inner surface of a bearing ring to be finished according to an embodiment of the present disclosure after finishing.
Figure 8:
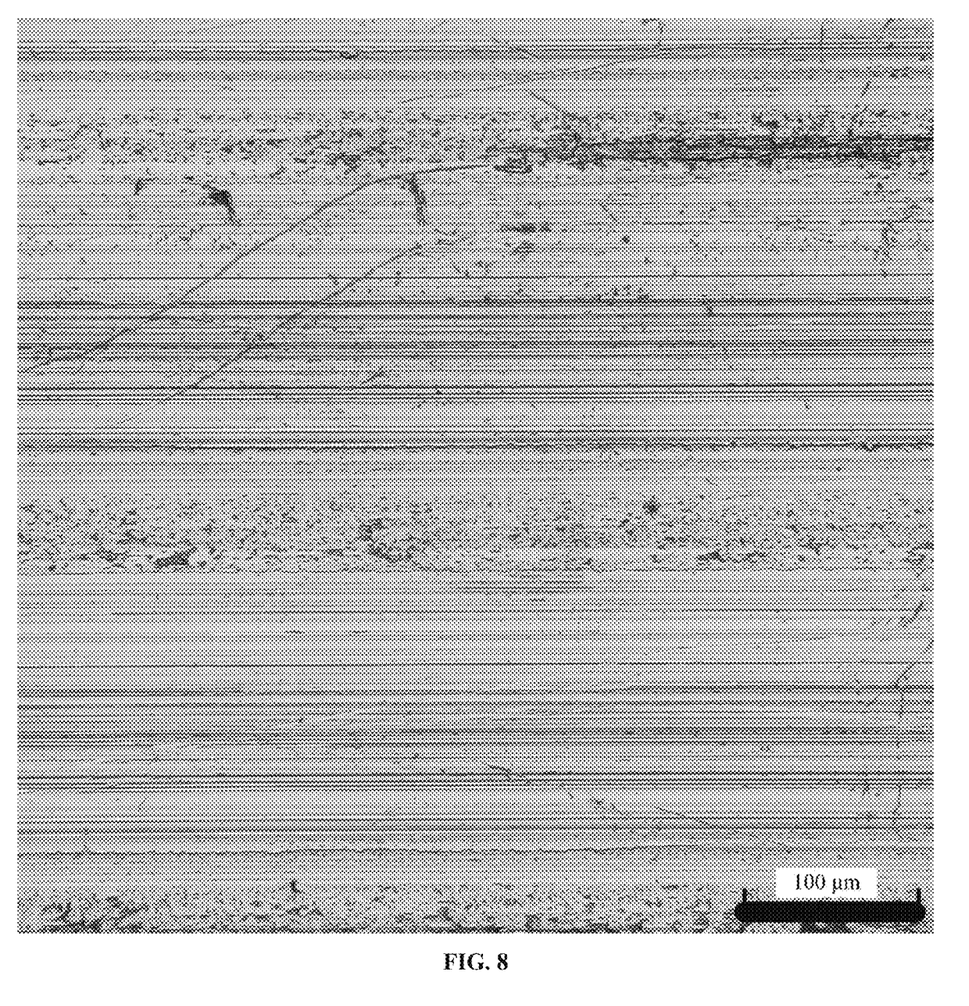
FIG. 8 is a surface topography diagram of an outer surface of a bearing ring to be finished according to an embodiment of the present disclosure before finishing.
Figure 9:
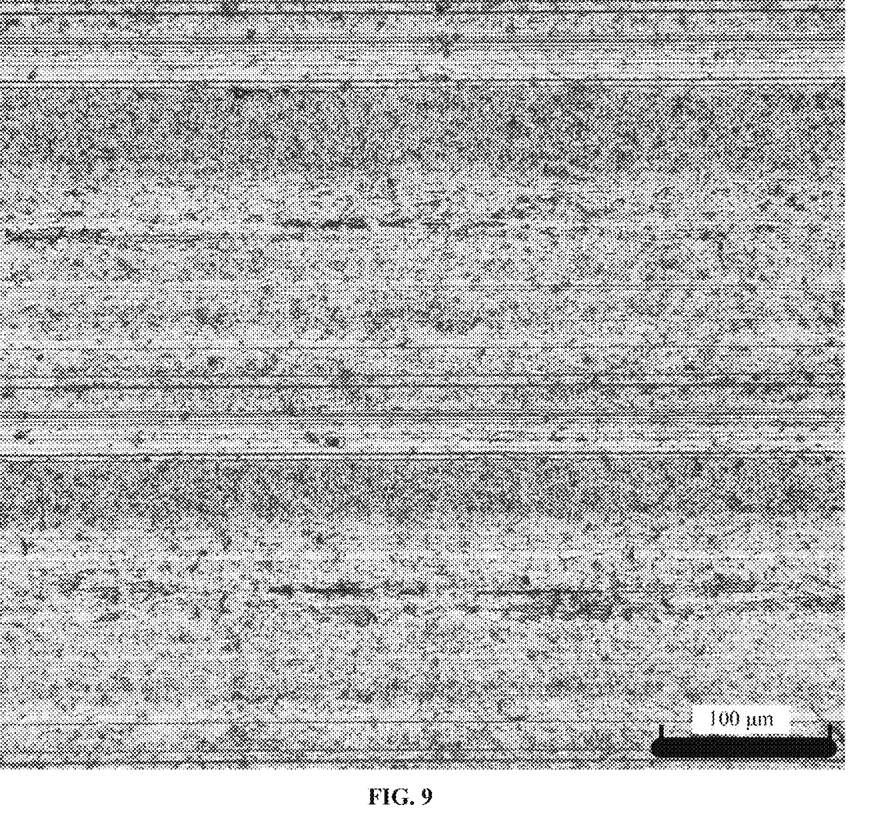
FIG. 9 is a surface topography diagram of an outer surface of a bearing ring to be finished according to an embodiment of the present disclosure after finishing.
Figure 10:
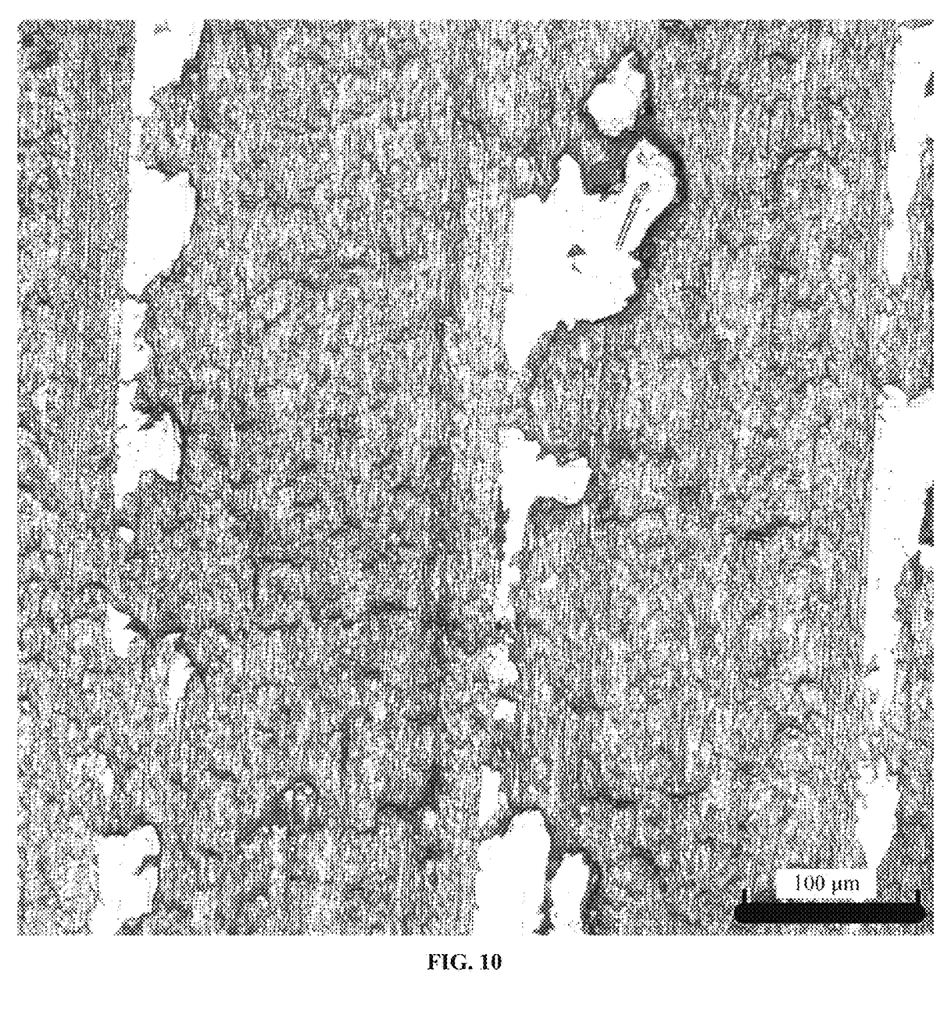
FIG. 10 is a surface topography diagram of an end surface of a bearing ring to be finished according to an embodiment of the present disclosure before finishing.
Figure 11:
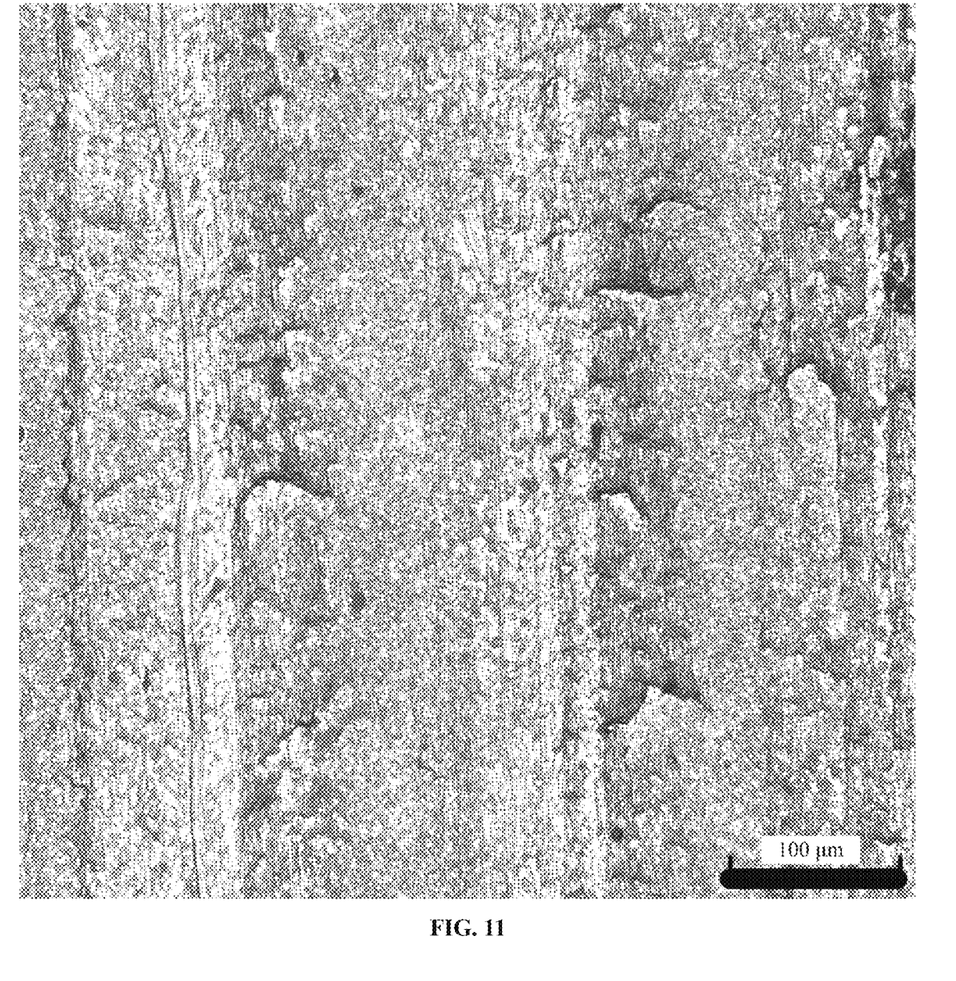
FIG. 11 is a surface topography diagram of an end surface of a bearing ring to be finished according to an embodiment of the present disclosure after finishing.

A certain embodiment of the present disclosure further provides a finishing method for distributed aero-engine bearing rings. The method is implemented based on the finishing device for distributed aero-engine bearing rings, and includes the following steps:

Step 1: mounting N bearing rings 13 to be finished onto N suspension assemblies 12 in a finishing container 5, filling a container body 4 of the finishing container 5 with finishing media 14, and assembling the container body 4 and a sealing cover 15 into the finishing container 5;

Step 2: fixedly connecting the finishing container 5 to a position between two support shafts 3 by flanges 6;

Step 3: starting a rotary driving motor 1 to make the finishing container 5 to rotate around an axis thereof at a rotating speed n, starting an excitation platform 9 at the same time to make the finishing container 5 achieve a simple harmonic motion with an amplitude of $A_1$ and a frequency of $f_1$ in a vertical direction, wherein the finishing container 5 forces a finishing media 14 therein to move in a compound motion attitude to carry out finishing on the bearing ring 13 to be finished;

Step 4: changing an excitation direction of the excitation platform 9 after finishing for time $t_1$, enabling the finishing container 5 to achieve a simple harmonic motion with an amplitude of $A_2$ and a frequency of $f_2$ in a horizontal direction consistent with the axis thereof, wherein the finishing container 5 forces finishing media 14 therein to move in a compound motion attitude to carry out finishing on the bearing ring 13 to be finished; and Step 5: completing surface finishing of the bearing ring 13 to be finished after finishing for time $t_2$, turning off the excitation platform 9 and the rotary driving motor 1, and taking down the finishing container 5, and taking out the finished bearing ring from the finishing container 5.

In order to achieve the surface integrity forming capacity of the inner and outer surfaces of the ring, there is a need to enhance the impact effect of the finishing media 14 on the inner and outer surfaces of the bearing ring 13 to be finished, and thus the finishing container 5 is excited in a vertical direction (Z-direction). In order to achieve the surface integrity forming capacity of the end surface of the ring, there is a need to enhance the impact effect of the finishing media 14 on the end surface of the bearing ring 13 to be finished, and thus the finishing container 5 is excited in a horizontal direction (X-direction). By alternately exciting the finishing container 5 in the vertical direction (Z-direction) and the horizontal direction (X-direction), the finishing requirements of the surface integrity forming of the inner surface, the outer surface and the end surface of the bearing ring 13 to be finished are fulfilled. The rotary driving motor 1 is connected to the finishing container 5 through the universal joint coupling 2, such that the finishing container 5 may achieve a composite motion state.

In a specific embodiment, if N is equal to 4, the number of the suspension assemblies 12 and the number of the bearing rings 13 to be finished are both 4, an eccentric distance e is 85 mm, the container body 4 is a regular hexagon, and an inscribed circle thereof has a radius R of 150 mm. A vertical distance $l_2$ from an outer surface of the bearing ring 13 to be finished at the lowest end to an inner wall of the container body 4 is 12.5 mm, an outer diameter $R_o$ of the bearing ring 13 to be finished is 50 mm, an inner diameter $R_i$ of the bearing ring 13 to be finished is 45 mm, and a width of the bearing ring 13 to be finished is 10 mm. There are six support rods 16 in the suspension assembly 12, a radius $R_{sb}$ of the support rod 16 is 7.5 mm, and a radius $R_d$ of a first virtual circle 100 is 35 mm. Lower limiting bars 11 are inserted between the six support rods 16 of the suspension assembly $l_2$, respectively, and there are six lower limiting bars 11. A vertical distance $l_1$ from the support rod 16 at the lowest end in the suspension assembly 12 to the inner surface of the bearing ring 13 to be finished is 5 mm. The finishing media 14 are a mixture of spherical $Al_2O_3$ particles with a particle size of 3 mm and liquid media. The finishing time $t_1$ is 120 min, and the finishing time $t_1$ is 120 min.

Based on the above embodiments, in a preferred embodiment, in Step 3, the rotating speed n of the finishing container 5 ranges from 80% $n_{cr}$ to 120% $n_{cr}$, $$n_{cr} = \frac{42.7}{\sqrt{2R}}$$

is a critical rotating speed of the finishing container, and R is an inner radius of the container body 4, m. In a specific embodiment, the rotating speed n is 60 r/min.

Based on the above embodiments, in a preferred embodiment, in Step 3, the excitation platform 9 has an amplitude of 2-8 mm and a frequency of 5-25 Hz in a vertical direction. In a specific embodiment, the amplitude is 4 mm, and the frequency is 15 Hz.

Based on the above embodiments, in a preferred embodiment, in Step 4, the excitation platform 9 has an amplitude of 2-8 mm and a frequency of 5-25 Hz in a horizontal direction. In a specific embodiment, the amplitude is 4 mm, and the frequency is 15 Hz.

Based on the above embodiments, in a preferred embodiment, a loading amount of the finishing media 14 in the finishing container 5 is 70%-90% of the volume of the finishing container 5. In a specific embodiment, the loading amount of the finishing media 14 is 80% of the volume of the container body 4.

Finally, in a specific embodiment, a roughness Ra value of the inner surface of the bearing ring 13 to be finished is reduced from 0.938 μm to 0.412 μm, and scratches on the inner surface are partially removed; a roughness Ra value of the outer surface is reduced from 0.815 μm to 0.698 μm, and scratches on the outer surface are partially removed; and a roughness Ra value of the end surface is reduced from 1.686 μm to 1.305 μm, and scratches on the end surface are partially removed, thus achieving the target of finishing. As can be seen from FIG. 6 to FIG. 11, through the finishing device and method provided by the present disclosure, the roughness of each of the inner surface, the outer surface and the end surface of the machined bearing ring is effectively reduced, indicating that the method can satisfy the finishing demand for the surface integrity forming of the inner surface, the outer surface and the end surface of the ring.

The above is only the specific embodiment of the present disclosure, such that those skilled in the art can understand or implement the present disclosure. Although the present disclosure has been described in detail with reference to the foregoing embodiments, those of ordinary skill in the art should understand that it is still possible to modify the technical solution described in the foregoing embodiments, or to replace some or all technical features with equivalents. However, these modifications or replacements do not make the essence of the corresponding technical solutions deviate from the scope of the technical solutions of various embodiments, and should be all included in the scope of protection of the claims.

What is claimed is:

1. A distributed finishing method for aero-engine bearing rings implemented by a distributed finishing device for aero-engine bearing rings, wherein the device comprises a finishing container and N suspension assemblies, and the finishing container comprises a container body and a sealing cover in detachable connection; each of the N suspension assemblies comprises a plurality of support rods configured to support bearing rings to be finished and uniformly distributed along a first virtual circle, the finishing container is filled with finishing media; the device further comprises a rotary driving motor, a universal joint coupling, mounting frames, and an excitation platform; flanges are fixedly connected to central positions of the sealing cover and a bottom wall of the container body outside the finishing container, and support shafts are fixedly connected to the central positions of the sealing cover and the bottom wall of the container body outside the finishing container by the flanges; the mounting frames are fixedly connected to the excitation platform by stiffener plates, rotating bearings are rotatably mounted at upper parts of the mounting frames, and the support shafts are connected to the rotating bearings on the mounting frames; one of the support shafts is connected to an output shaft of the rotary driving motor through the universal joint coupling, and the method comprises the following steps:

Step 1: mounting N bearing rings to be finished onto the N suspension assemblies in the finishing container, filling the container body of the finishing container with the finishing media, and assembling the container body and the sealing cover into the finishing container;

Step 2: fixedly connecting the finishing container to a position between the support shafts by the flanges;

Step 3: starting the rotary driving motor to make the finishing container rotate around an axis thereof at a rotating speed n, starting the excitation platform at the same time to make the finishing container achieve a simple harmonic motion with an amplitude of $A_1$ and a frequency of $f_1$ in a vertical direction, wherein the finishing container forces the finishing media therein to move to carry out finishing on the N bearing rings to be finished;

Step 4: changing an excitation direction of the excitation platform after finishing for time $t_1$, enabling the finishing container to achieve an additional simple harmonic motion with an amplitude of $A_2$ and a frequency of $f_2$ in a horizontal direction consistent with the axis of the finishing container, wherein the finishing container forces the finishing media therein to move to carry out finishing on the N bearing rings to be finished; and Step 5: completing surface finishing of the N bearing rings to be finished after finishing for time $t_2$, turning off the excitation platform and the rotary driving motor, taking down the finishing container, and taking out the N finished bearing rings from the finishing container.

2. The distributed finishing method for aero-engine bearing rings according to claim 1, wherein in Step 3, the rotating speed n of the finishing container ranges from 80% $n_{cr}$ to 120% $n_{cr}$, $$n_{cr} \approx \frac{42.7}{\sqrt{2R}}$$

is a critical rotating speed of the finishing container, and R is a radius of an inner wall of the container body, in meters (m).

3. The distributed finishing method for aero-engine bearing rings according to claim 1, wherein in Step 3, $A_1$ ranges from 2 mm-8 mm and $f_1$ ranges from 5 Hz-25 Hz.

4. The distributed finishing method for aero-engine bearing rings according to claim 1, wherein in Step 4, $A_2$ ranges from 2 mm-8 mm and $f_2$ ranges from 5 Hz-25 Hz.

5. The distributed finishing method for aero-engines bearing ring according to claim 1, wherein a loading amount of the finishing media in the finishing container is 70%-90% of a volume of the finishing container.

* * * * *